United States Patent
Wiemann et al.

(10) Patent No.: US 8,392,780 B2
(45) Date of Patent: Mar. 5, 2013

(54) COMMUNICATION CONTROL METHOD

(75) Inventors: Henning Wiemann, Aachen (DE);
Niclas Wiberg, Linköping (SE);
Joachim Sachs, Aachen (DE); Reiner Ludwig, Hürtgenwald (DE); Michael Meyer, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 650 days.

(21) Appl. No.: 12/293,752

(22) PCT Filed: Mar. 21, 2006

(86) PCT No.: PCT/EP2006/002568
§ 371 (c)(1),
(2), (4) Date: Mar. 25, 2010

(87) PCT Pub. No.: WO2007/107168
PCT Pub. Date: Sep. 27, 2007

(65) Prior Publication Data
US 2010/0180172 A1    Jul. 15, 2010

(51) Int. Cl.
*G06F 11/00* (2006.01)
(52) U.S. Cl. .................. 714/748; 714/749
(58) Field of Classification Search .............. None
See application file for complete search history.

(56) References Cited

U.S. PATENT DOCUMENTS

| | | | |
|---|---|---|---|
| 5,699,367 A * | 12/1997 | Haartsen | 714/749 |
| 7,839,858 B2 * | 11/2010 | Wiemann et al. | 370/394 |
| 7,864,799 B2 * | 1/2011 | Sachs | 370/466 |
| 2002/0051425 A1 * | 5/2002 | Larsson | 370/252 |
| 2006/0282739 A1 * | 12/2006 | Meyer et al. | 714/748 |
| 2007/0245204 A1 * | 10/2007 | Yomo et al. | 714/749 |
| 2008/0317017 A1 * | 12/2008 | Wiemann et al. | 370/389 |

* cited by examiner

*Primary Examiner* — Michael Maskulinski

(57) ABSTRACT

Methods of controlling peers of a relay ARQ protocol are described. It is proposed to provide a predetermined marking in the payload section of messages of the relay ARQ protocol, such that relay peers along the relay connections can extract information from the payload section.

36 Claims, 15 Drawing Sheets

COMMUNICATION CONTROL METHOD

FIELD OF THE APPLICATION

The present application relates to methods of controlling a peer of a relay protocol, to communication devices arranged for implementing peers of a relay protocol, and to a data structure of a data unit of a relay protocol.

BACKGROUND OF THE INVENTION

The present invention basically relates to the general field of data unit communication. In data unit communication, an amount of data is divided into individual units or pieces, and these pieces of data are transmitted to a desired receiver over an appropriate communication path. This form of data communication is very well known and in wide use.

Such data units carry a variety of names in the context of different communication systems and communication protocols such as packets, frames, segments, protocol data units, etc. The term "data unit" as used in the present specification and claims generically refers to any such division of a data amount.

In order to ensure the complete transmission of data units from a sender to a receiver, a mechanism referred to as ARQ (Automatic Retransmission reQuest) is known. When using an ARQ mechanism, the receiver of data units sends feedback messages to the sender, such that the sender can determine whether said data units were properly received, and if not, to appropriately perform retransmissions of data units. Such feedback messages can take various forms, e.g. acknowledgement messages (ACKs) that positively acknowledge correct receipt of a given data unit, negative acknowledgements (NACKs) that indicate an incorrect receipt, or report messages that can provide both of the above kinds of information, possibly together with further more detailed information.

Within the context of the present specification and claims, communications from a source of data units or sending end-peer to an intended receiver or receiving end-peer will be referred to as data unit messages, and the communication of feedback from the receiving end-peer to the sending end-peer will be referred to as feedback messages. The term "message" refers to both data unit messages and feedback messages.

Patent application PCT/EP2004/009967, the contents of which is herewith fully incorporated by reference, describes a novel concept of communicating data unit messages over a connection that comprises one or more relay points, i.e. over a multi-hop connection. This novel concept can also be referred to as relay ARQ. In accordance with relay ARQ, a single connection is established between a sending end-peer of a relay protocol and a receiving end-peer of a relay protocol, over one or more relay peers of the relay protocol, where a common protocol state is shared between the end-peers and the relay peers. FIG. 11 shows a simple illustration of a relay protocol using ARQ, applied e.g. to a link layer L2. Reference numeral 110 relates to a sending node wishing to send data unit messages to a receiving node 112. In FIG. 11, one relay node 111 is provided. There could also be further relay peers between the shown node 111 and the end node 112. In the example, the layer 2 comprises a relay ARQ protocol that acts to establish a single connection using a sending end-peer in node 110, a relay peer in node 111 and a receiving end-peer in node 112.

In accordance with the relay ARQ concept, data unit messages are sent in the direction of the receiving end-peer, and feedback messages are sent in the direction of the sending end-peer. Each message comprises a control section (e.g. a header) and a payload section. In accordance with the relay protocol, the sending end-peer sends data unit messages arranged in a sequence towards the receiving end-peer. Each sent data unit message is identifiable by a sequence position identifier, e.g. a sequence number. Using said sequence position identifiers, the feedback messages carry receipt information on a receipt of the data unit messages. Each peer that sends data unit messages can then perform retransmission control on the basis of the information from the feedback messages. An important aspect of the relay ARQ concept is that there are at least two types of receipt information, namely a first type of receipt information is indicative of a correct receipt of a data unit message at one of the relay peers, and a second type of receipt information is indicative of a correct receipt of a data units message at the receiving end-peer. The first type of receipt information can also be called a relay acknowledgment (RACK), while the second type of information can be referred to as an acknowledgement (ACK).

In accordance with the relay ARQ concept, a sending-end peer of the relay ARQ protocol receives a first type of receipt information when a data unit message has been successfully received at the next relay peer. In this event, the sending-end peer can temporarily delegate the retransmission responsibility to the relay peer. The one or more relay peers are arranged to forward at least the payload sections of data unit messages towards the receiving-end peer and to forward at least the second type receipt information towards the sending-end peer. In this way, when the sending-end peer receives the second type receipt information, it knows that the respective data unit (as identified by the sequence position identifier) has been correctly received at the receiving end-peer. In the event that the one or more relay peers can enter or leave the communication during the sending of a given sequence of data unit messages, it is therefore preferable that the sending end-peer retains each data unit message until having received the second type of receipt information. Thereby it retains the final control over the transmission of the data unit messages.

Each peer of the relay ARQ protocol that sends data unit messages (i.e. the sending end-peer and each relay peer) preferably conducts a first type of retransmission control for data unit messages for which no receipt information has been received, and a second retransmission control for such data unit messages for which the first type of receipt information has been received, but not the second type. In other words, once a peer has received the indication that the next peer in the direction of the receiving end-peer has correctly received the data unit message (which is learned by receiving the first type of receipt information), then the retransmission effort can be reduced, as the responsibility for transporting the data unit message further may be given to the next peer.

The relay ARQ concept is successful in controlling the transmission of data unit messages from a sending end-peer to a receiving end-peer over one or more relay peers. Nonetheless, it is the object of the present application to improve the relay ARQ concept.

SUMMARY OF THE INVENTION

The above object is achieved by the subject-matter described in the independent claims. Advantageous embodiments are described in the dependent claims.

In accordance with the present invention, it is proposed to improve the communication capabilities among the peers of the relay ARQ protocol. This is achieved by providing the relay peers with a capability of extracting information from the payload section of data unit messages and/or feedback messages on the basis of the presence of a predetermined marking in the control section of the messages, and/or by providing peers of the relay ARQ protocol that send data unit messages (i.e. the sending end-peer and relay peers) with the capability of setting such a predetermined marking.

In this way, a relay peer of the relay ARQ protocol may extract information, i.e. read from the payload section of data unit messages and/or feedback messages in which the special marking is present. A peer that sets the special marking can therefore control a sharing of information. It is e.g. possible to provide in-band data transmission to higher layer applications in relay nodes that implement a relay peer of the relay ARQ protocol, without having to establish additional ARQ connections in parallel. By setting the special marking, the point-to-point data connection from the sending end-peer to the receiving end-peer turns into a type of data bus from which one or more of the involved relay peers may extract information. This therefore provides a type of bus functionality, such that the special marking may also be referred to as a bus marking or bus flag.

The peer that sets the special marking may or may not at the same time insert information of its own into the payload section of such messages for which the predetermined marking is set. If no additional information is inserted, then the payload information of the end-to-end data unit messages or feedback messages exchanged between the sending end-peer and the receiving end-peer can be shared among the relay peers. This can e.g. be useful for providing information to higher layer peers co-located with the relay peers of the relay ARQ protocol, or can be also be useful to share information at the level of the relay ARQ protocol itself e.g. during a set-up. If a peer is additionally able to insert information into the payload section of such messages for which the predetermined marking was set, then this provides the additional possibility of letting e.g. relay peers send information of their own to one or more other peers involved in the overall communication, without having to establish dedicated parallel connections.

BRIEF DESCRIPTION OF FIGURES

Embodiments of the present invention will now be described by making reference to the enclosed figures, in which.

DETAILED DESCRIPTION OF EMBODIMENTS

Figure 11:
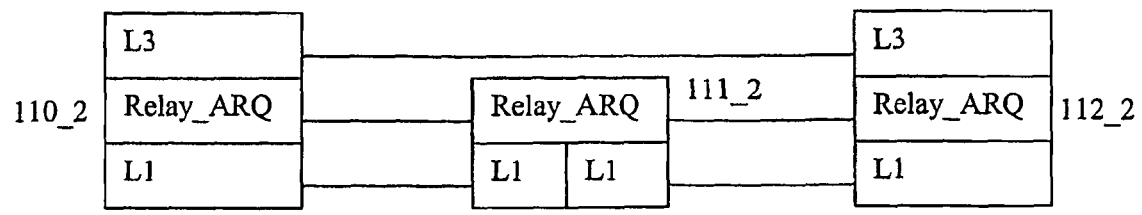
FIG. 11 shows nodes implementing a protocol hierarchy that involves a relay ARQ protocol.

As already specified before, the present invention relates to an improvement in a communication system using a relay protocol with ARQ function, which can also be referred to as a relay ARQ protocol. FIG. 11 shows an example of a relay connection comprising a sending end-peer 110_2 in a sending node 110, a receiving end-peer 112_2 in a receiving node 112, and one or more relay peers, such as the shown relay peer 111_2 in relay node 111. Messages adhering to the relay ARQ protocol are sent over the connection: data unit messages from the sending end-peer to the receiving end-peer via the one or more relay peers, and feedback messages from the relay and the receiving end-peer towards the sending end-peer. The messages comprise a control section (such as a header) and a payload section. In the data unit messages, the payload section generally contains parts or pieces of the overall data amount being sent from the sending end-peer to the receiving end-peer in a sequence. Each data unit message is identifiable by a sequence position identifier, e.g. a sequence number. The sequence position identifiers can e.g. be contained in the control section of the respective data unit message. The sequence position identifiers can be chosen in any suitable or desirable way, e.g. can be ordinal such as 1, 2, 3 etc., or can be expressed as a bit or byte count value of an overall data amount being sent. In other words, if a data amount of 2048 bits is to be sent, then a first data unit message may carry the first 512 bits, where 512 then is the sequence position identifier identifying the first data unit message, the second data unit message carries bits 513 to 1024, such that 1024 is the sequence position identifier identifying the second data unit message, etc.

The feedback messages make use of the sequence position identifiers to carry receipt information on a receipt of the data unit messages. This can be done in any suitable or desirable way, e.g. the feedback messages may comprise individual information associated with individual sequence position identifiers, such as confirmation of correct receipt or indication of incorrect receipt. The feedback messages may also comprise summary feedback information, e.g. indicating the sequence position identifier of the data unit message up to which all data unit messages have been correctly and completely received in sequence.

The relay ARQ protocol provides for at least two types of receipt information, namely a first type that is indicative of a correct receipt of a data unit message at a relay peer, where this first type of receipt information is therefore also referred to as a relay acknowledgement or RACK. Furthermore, a second type of receipt information is provided, which is indicative of a correct receipt of a data unit message at the receiving end-peer of the relay protocol, which is also referred to as an acknowledgement or ACK.

The sending end-peer and the one or more relay peers perform retransmission procedures on the basis of the feedback messages. For example, each peer that itself sends data unit messages may conduct a first retransmission procedure for a' data unit message that has been sent but for which no first type receipt information has been received, and a second, different retransmission procedure for such sent data units for which the first type of receipt information has been received but not the second. For example, the first retransmission procedure can consist in applying a first retransmission time-out period that leads to a retransmission if no first or second type receipt information is received within the first time-out period. In the second retransmission procedure, a second time-out period may be applied which leads to a retransmission if no second type receipt information is received within the second time-out period. The second time-out period can be chosen to be longer than the first time-out period, as the peer that is sending data unit messages (be it the sending end-peer or a relay peer) can delegate the responsibility for the further transmission of the data unit messages to the relay peer that sent the first type receipt information. However, the second time-out period serves to ensure that the respective peer that sends data unit messages can still conduct a retransmission if e.g. one of the relay peers along the connection drops out. It is therefore preferable that especially the sending end-peer retains each data unit message in its output buffer until having received the second type receipt information, which confirms the correct receipt at the receiving end-peer. Thereby, the sending-peer always retains the possibility of itself performing a retransmission, until the ACK has arrived.

Each relay peer is arranged to conduct a procedure for forwarding at least the payload section of data unit messages towards the receiving end-peer and for forwarding at least the receipt information of the second type towards the sending end-peer. Naturally, a relay peer may also be able to forward an entire data unit message, i.e. both control section and payload section. Furthermore, a relay peer can also be able to forward all types of receipt information, i.e. also the first type of information.

Each relay peer will also comprise a procedure for reading the control sections of at least some of the messages being sent over the relay connection. In general, the control section of all data unit messages will be read, in order to obtain the control information for processing and forwarding the data unit messages. Preferably, the control sections of all feedback messages are also read, but this is not a necessity.

Figure 1:
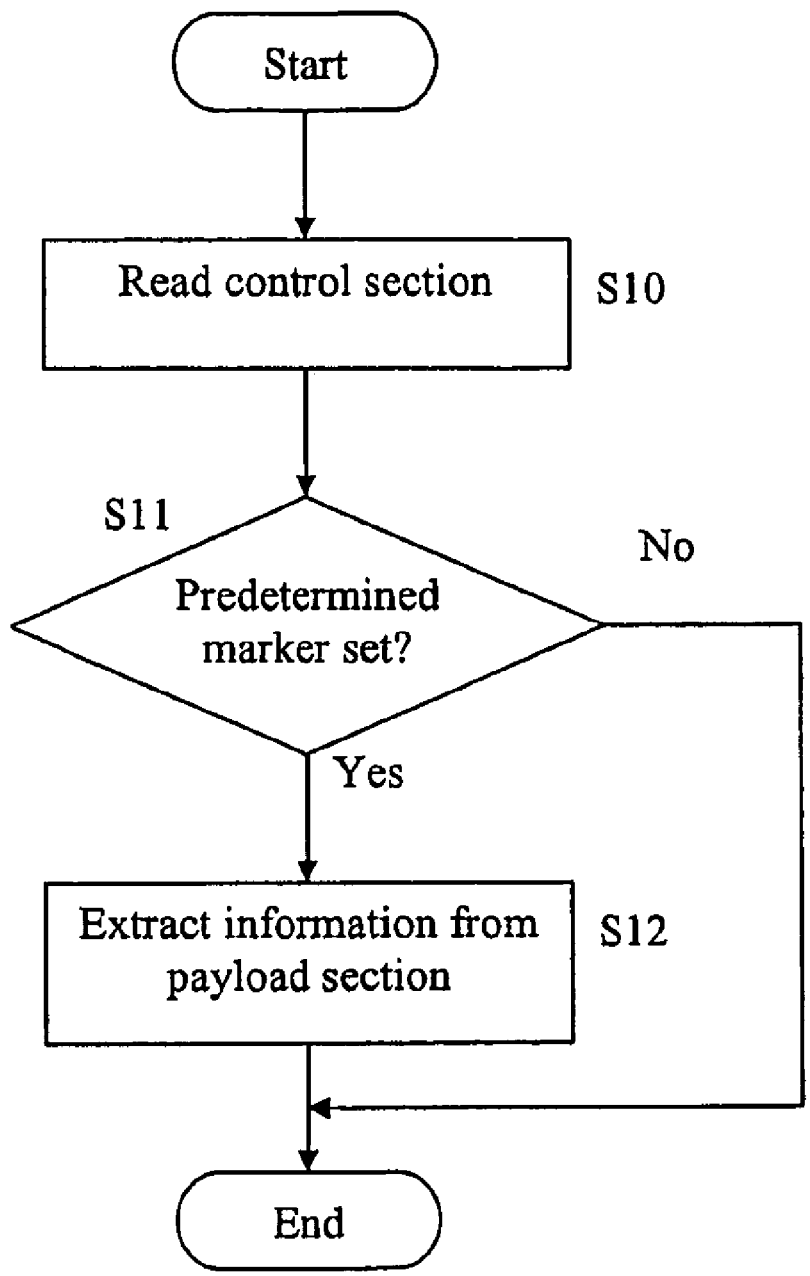
FIG. 1 shows a flowchart of a method embodiment of the invention.

In accordance with an embodiment of the present invention, the control method for a relay peer of a relay ARQ protocol comprises a procedure for extracting information from the payload section of such messages sent over the relay connection that comprise a predetermined marker in the control section. In other words, the procedure for extracting information extracts information from the payload section, if the control section reading procedure detects the presence of a predetermined marker. A basic flowchart of such a method is shown in FIG. 1. In a first procedure S10, the control section of a received message is read. Then, in step S11 it is determined whether the predetermined marker is present or not. If the predetermined marker is present, then procedure S12 extracts information from the payload section of that message. It is noted that the control method of the relay peer can be such that the payload section of one or both of data unit messages and feedback messages can be read.

As a consequence, according to this embodiment of the present invention, a relay peer of a relay ARQ protocol is arranged such that it can do more than simply pass the payload section of a message onwards in the appropriate direction (i.e. payloads of data unit messages towards the receiving end-peer and payloads of feedback messages towards the sending end-peer), but may also be able to read the payload sections of selected messages, namely such messages that carry the predetermined marker in the control section.

Figure 7A:
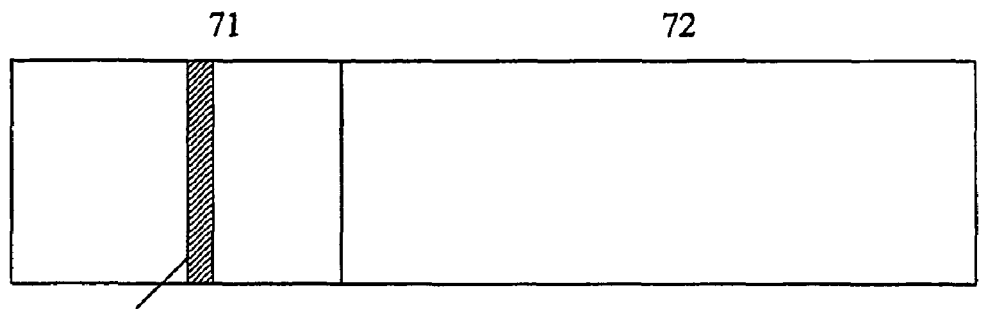
FIGS. 7a-7c show schematic examples of data structures according to embodiments of the present invention.

The predetermined marker in the control section can be chosen in any suitable or desirable way. FIG. 7a shows a schematic representation of a message comprising a control section 71 and a payload section 72. The control section 71 comprises a marker 710. For example, the marker can be arranged in such a way that a certain location in the control section 71 is reserved for the marker and a specific data value at that position indicates that the marker is set. In the simplest case, the marker position consists of 1 bit, where one bit value (e.g. 1) indicates that the marker is set and consequently the other bit value indicates that the marker is not set. Naturally, other possibilities for the marker are possible, namely the marker can consist of a predetermined data pattern that may be located at any position within the control section.

By employing the marker or flag 710, the point-to-point connection from sending end-peer to receiving end-peer becomes a type of data bus from which one or more of the involved relay peers may extract information. As such, the marker 710 can also be referred to as a bus marker or bus flag.

Figure 7B:
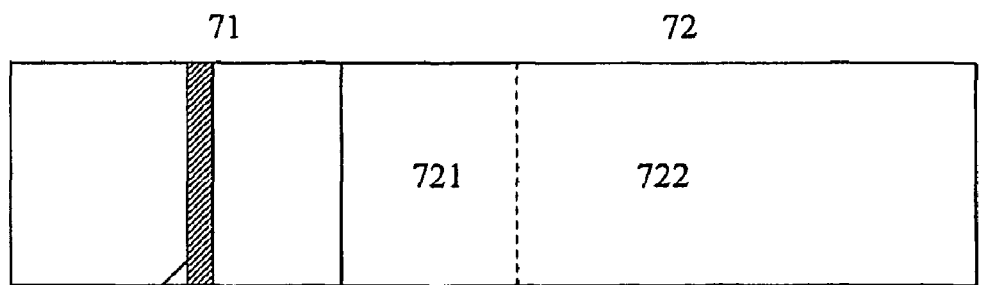

In addition to the bus flag 710, it is furthermore possible to add a relay peer identifier in the messages in which the bus flag is set. This can be done in any suitable or desirable way, e.g. as shown in FIG. 7b. In FIG. 7b the payload section 72 of a message in which the bus flag 710 is set comprises an ID section 721 and an information section 722. In the ID section 721 suitable identification information is placed. Then, the control method of the relay peer can preferably be arranged in such a way that the procedure for extracting information only extracts information from the payload section 72 (more specifically from the information section 722) if the identifier in section 721 is associated with the relay peer being controlled. For example, the relay peer identifier can be a simple device identity of the device implementing the relay peer. By using this feature, it becomes possible to perform a type of bus addressing, in order to send information to one or more specific relay peers. It is noted that the identification section 721 can comprise several identities associated with a plurality of relay peers.

A relay peer that extracts information from the payload section of a message can use the extracted information in any suitable or desirable way. For example, the information may be passed to a protocol layer lying above the layer of the relay protocol. In other words, it is e.g. possible that an application is provided above the relay peer 111_2 in FIG. 11, to which the relay peer 111_2 passes information extracted from the payload section of data unit messages and/or feedback messages.

The type or content of extracted information will naturally depend on the situation. For example, the information in the payload section of a message of which the control section contains the predetermined marker can be directed to all relay peers and contain general information on the relay connection, such as a currently estimated round-trip time (RTT), a currently estimated data rate, etc. Equally, e.g. in the situation in which a message is addressed to a specific peer, the information to be extracted can specifically relate to that relay peer, e.g. that the sub-connection to the relay peer will be dropped within a predetermined time span.

According to an embodiment of the present invention, the method of controlling a relay peer is such that a message in which the procedure for reading the control section detected the presence of the predetermined marker is forwarded after extracting the information from the payload section, even if the message was only addressed to a particular relay peer. This is advantageous when applied to data unit messages, which are each associated with a sequence position identifier of the overall data sequence being sent from the sending end-peer to the receiving end-peer. As such, the various peers along the relay connection expect to receive the second type receipt information (ACK) from the receiving end-peer.

Therefore, it is advantageous if all data unit messages are forwarded, such that they can be received by the receiving end-peer, and consequently acknowledged.

On the other hand, it is equally possible to arrange the method of controlling a relay peer of the relay protocol in such a way that the messages in which the procedure for reading the control section detected the presence of the predetermined marker are discarded after extracting the information from the payload section. For example, if the overall procedure is such that the receiving end-peer or one of the relay peers forwarding feedback messages duplicates an existing feedback message and then sets the predetermined marker in the duplicate, and then adds specific individualised information to the payload section of that feedback message, and if the thus modified duplicate feedback message is addressed to a particular relay peer upstream, then there is no problem in simply dropping the modified duplicate feedback message after having extracted the information.

It is equally possible to discard data unit messages. For example, if a relay peer of the relay protocol duplicates an "old" sequence position identifier, i.e. a sequence position identifier for which the second type receipt information has already been received, and if the corresponding data unit message is addressed to a particular relay peer, then there is no disturbance of the overall communication of the data sequence if the addressed relay peer simply discards the data unit message with the old sequence position identifier after having extracted the data from the payload section.

According to another embodiment, if a relay peer is controlled to discard data unit messages after having extracted the information from the payload section, then it may have a procedure for sending out an indication of that discarding. In other words, other peers of the connection are informed of the fact that a data unit message was discarded, such that they do not need to wait for the data unit message carrying the sequence position identifier of the discarded data unit message. For example, the sending end-peer 110_2 of FIG. 11 transmits a data unit message with a sequence position identifier "n" that contains a signalling message addressed only to the relay peer 111_2, then relay peer 111_2 can drop this data unit message after extracting the signalling information from the payload section. Preferably, it will send an indication to the following nodes (in the example of FIG. 11 the receiving end-peer 112_2) that no data unit message with sequence position identifier "n" will be forwarded. The receiving end-peer may then send a feedback message carrying special receipt information to the sending end-peer. More details on the possibilities and mechanisms for dropping data unit messages and informing peers of the connection are described in co-pending patent application PCT/EP2005/005791, the entire contents of which are herewith incorporated by reference.

In the preceding embodiments, it was described how a relay peer may extract information from the payload section of messages in which the presence of a predetermined marker or flag in the control section was detected. As such a marker or flag must be set in the control section of a message before it can be read, a further embodiment of the present invention relates to a method of controlling a peer of a relay protocol, where said peer can be a sending end-peer or a relay peer, comprising a marker setting procedure, for setting the predetermined marker or flag in the control section of one or more messages being sent by the peer. If the peer is the sending end-peer, then the messages being sent will be data unit messages sent towards the receiving end-peer. If the peer is a relay peer, then the messages being sent can be data unit messages or feedback messages.

Figure 2:
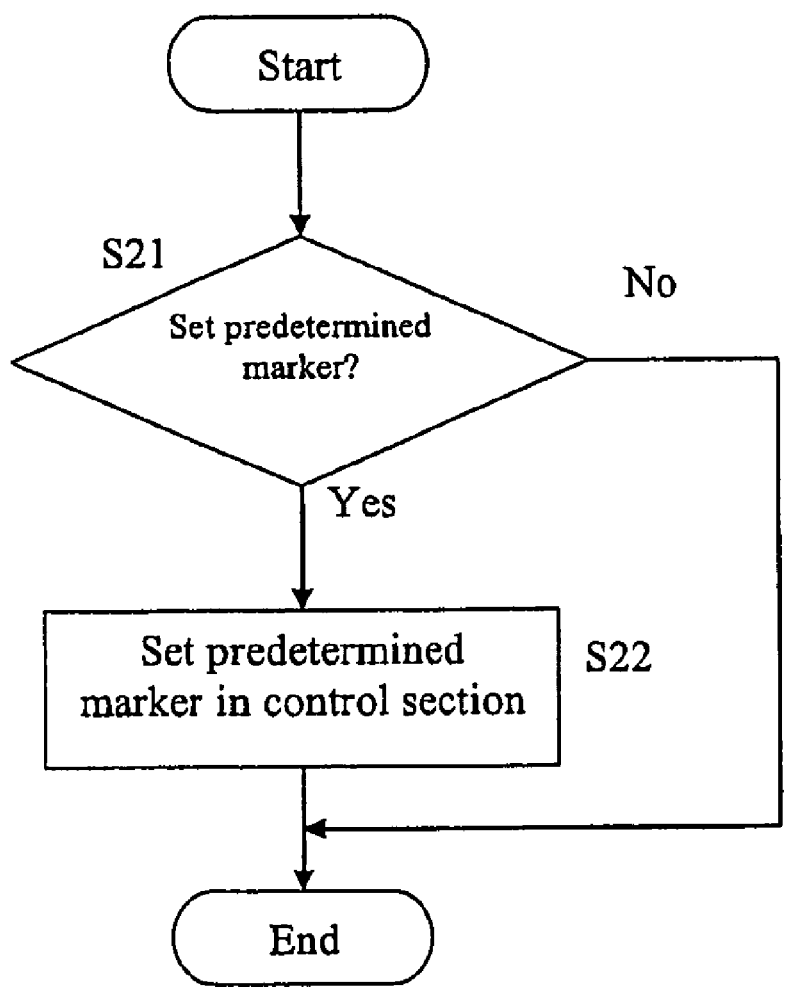
FIG. 2 shows a flowchart of a further method embodiment of the present invention.

FIG. 2 shows a flowchart of an embodiment. In a first step S21, the control procedure determines whether the predetermined marker or flag is to be set in a given message, and if it is decided to do this, then the procedure S22 sets the predetermined marker in the control section of the given message. The marker and message structure can be as previously described in connection with FIG. 7.

The decision in step S21 can depend on any suitable or desirable condition, and examples will be given further on. As a first example, the decision of step S21 can depend on whether the control procedure for the peer wishes to convey information to one or more other peers using the mechanism that other peers can read the payload section of such messages in which the predetermined marker is set in the control section.

It is noted that a peer that is capable of setting the predetermined marker must not necessarily also implement the functionality of being able to extract information upon detecting the predetermined marker in a received message.

However, preferably the functionality of being able to extract information from the payload section of a message in which the control section contains the predetermined marking is combined with the functionality of being able to set the predetermined marking in messages that are being sent.

The control method according to which a procedure is provided for setting the predetermined marker preferably also comprises the capability of including a relay peer identifier. For example, this can be achieved as described in connection with FIG. 7*b*, namely by providing a relay peer identification subsection 721 and the information subsection 722 in the payload section 72 of a message.

The setting of the predetermined marker in the control section of a message can have various reasons. For example, the sending end-peer may simply wish to share the information being sent in the payload sections to the receiving end-peer with one or more of the relay peers along the relay connection. In this case, the sending end-peer simply sets the predetermined marker or bus flag and thereby lets the relay peers look into the payload sections. This can e.g. be useful in a situation, in which information on the set-up of a specific communication over the relay connection is being sent to the receiving end-peer. Namely, the sending end-peer may in this case be transmitting information on the connection to the receiving end-peer for specific control purposes (e.g. for streaming), and this information on the overall relay connection can also be useful for each relay peer for individual control purposes.

Figure 3:
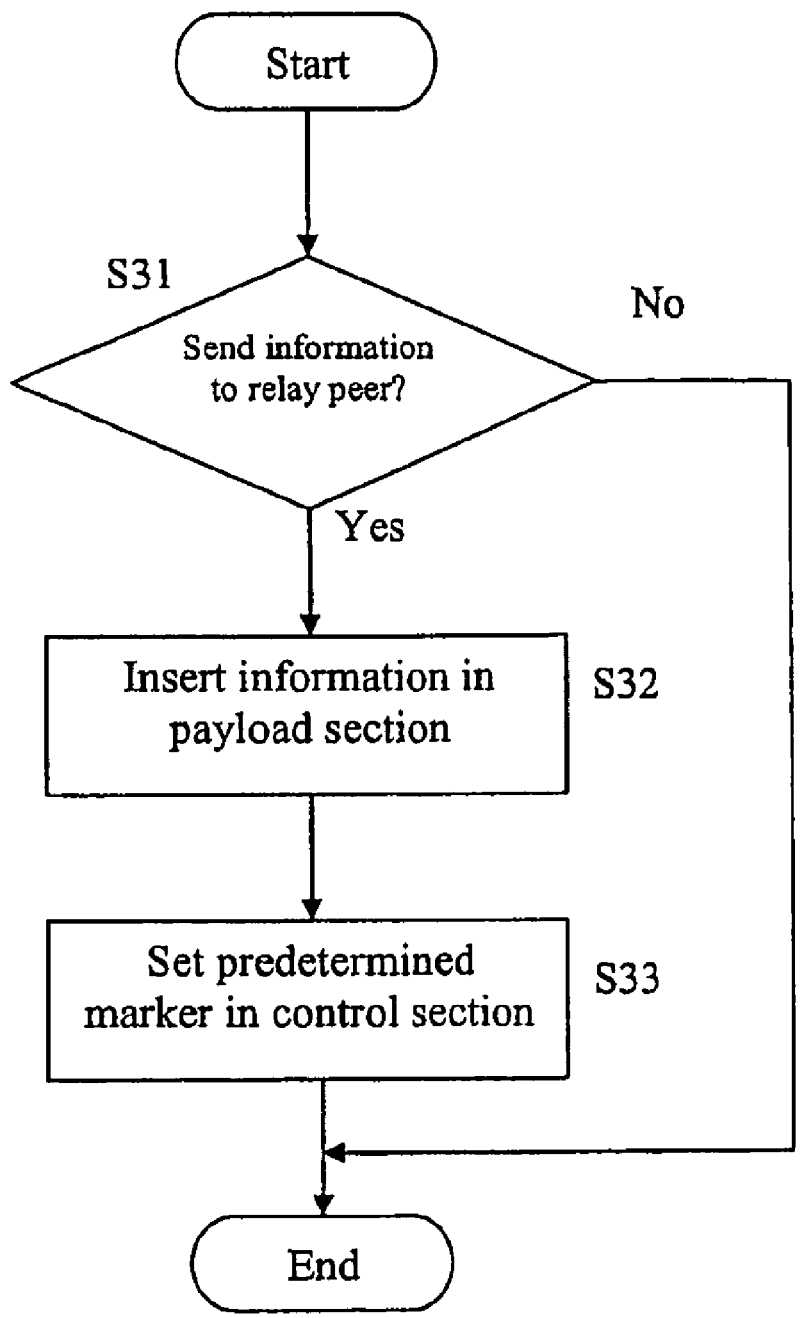
FIG. 3 shows a further flowchart of a method embodiment of the invention.

According to a preferred embodiment, the method of controlling a peer, especially of a relay peer comprises an information insertion procedure for inserting information into the payload section of a message for which the peer sets the predetermined marker in the control section. In other words, in this case, a peer that sends messages is capable of placing desired information of its own into a message, where said information of its own could be directed to one, several or all other peers of the relay connection. An example can be seen in FIG. 3. In FIG. 3, a first step S31 determines whether the peer wishes to transmit information to one or more relay peers along the relay connection. Step S31 is an example of step S21 shown in FIG. 2. If it is desired to transmit information to one or more relay peers, then the flow passes to procedure S32 for inserting the desired information into the payload section of a given message, and then to procedure S33 for setting the predetermined marker or bus flag in the control section of the given message. If the option exists to set one or more relay peer identifiers for addressing the given message to specific relay peers, then the setting of the one or more relay peer identifications can also be conducted in step S32.

The type of information to be inserted can be selected in any suitable or desirable way, depending on the situation. For example, the concept of information insertion can be useful for inserting information that is associated with a set-up process for the relay connection. In other words, a relay peer may wish to communicate specific parameters or measurement values to another relay peer during the overall communication of messages from the sending end-peer to the receiving end-peer, and can do this using the just described mechanism. Another example of information that can be inserted into the payload section of messages by a relay peer is status information on the relay connection. Such status information may relate to the present status or a future status. An example of the former is the communication of measurement parameters, like link roundtrip time (RTT), and an example of the latter can be the announcement of an upcoming event, like "link will be dropped in 10 seconds".

According to a further preferred embodiment of the invention, the method of controlling the peer of the relay protocol comprises a procedure for adding an indication to at least some of said messages in which the predetermined marker is set, where said indication is arranged such that the end-peer receiving the messages comprising the indication disregards the payload section. The purpose of this feature is to allow a distinction especially of data unit messages with respect to whether they are intended for the receiving end-peer or not. Namely, if a relay peer sets the additional indication in a data unit message, then this signal is to the receiving end-peer that despite being associated with a valid sequence position identifier and otherwise having a valid format, the content of the data unit message is nonetheless not part of the end-to-end flow, and should therefore be ignored at the receiving end-peer. On the other hand, if the information in the payload section is also intended for the receiving end-peer, then the supplementary indication will not be set by the relay peer.

Basically, a peer capable of inserting information into the payload section of a message can do this for any message being sent or forwarded. In other words, if the peer wishes to convey information, it can simply take the next available message and insert the information into the payload section and set the marking in the control section. Depending on the specific situation, such action may or may not have an influence on the overall flow of information from sending end-peer to receiving end-peer. For example, if cumulative acknowledgements are used as feedback messages (i.e. a feedback message indicates up to which sequence position identifier the data unit messages have been correctly received and completely received within the terms of the sequence), then the "stealing" of a feedback message by a relay peer for inserting its own information into the payload section will have little impact on the overall communication of feedback information to the sending end-peer, as the next regular feedback message will comprise the same information as was contained in the stolen feedback message. In other words, there is no problem if a relay peer simply takes an available feedback message and inserts its own information into the payload section.

When information is to be inserted into the payload section of data unit messages, then the "stealing" of a data unit message, although in principle possible and in certain situations tolerable, will in general lead to the problem that the data amount corresponding to the sequence position identifier of the stolen data unit message will be missing from the overall sequence. As a consequence, according to a preferred embodiment, a peer that is capable of inserting information into the payload section of messages and which can set the predetermined marker in the payload section of such messages, is additionally capable of conducting a discrimination procedure for discriminating data unit messages as suitable for setting the predetermined marker in the control section and inserting information in the payload section.

The choice of which messages are suitable and which are not to be made by the discrimination procedure can in principle be arranged in any suitable or desirable way. Preferably, the discrimination procedure comprises looking for specific suitability information in messages being received. This specific suitability information can e.g. be a further predetermined marker or flag that indicates that the messages carrying the suitability marker is itself suitable for inserting information in the payload section, or the suitability information can also relate to one or more other messages than the one carrying the suitability information, and e.g. consist of one or more sequence position identifiers that can be used for data unit messages in which information can be inserted in the payload section. This will now be described in more detail.

Figure 4:
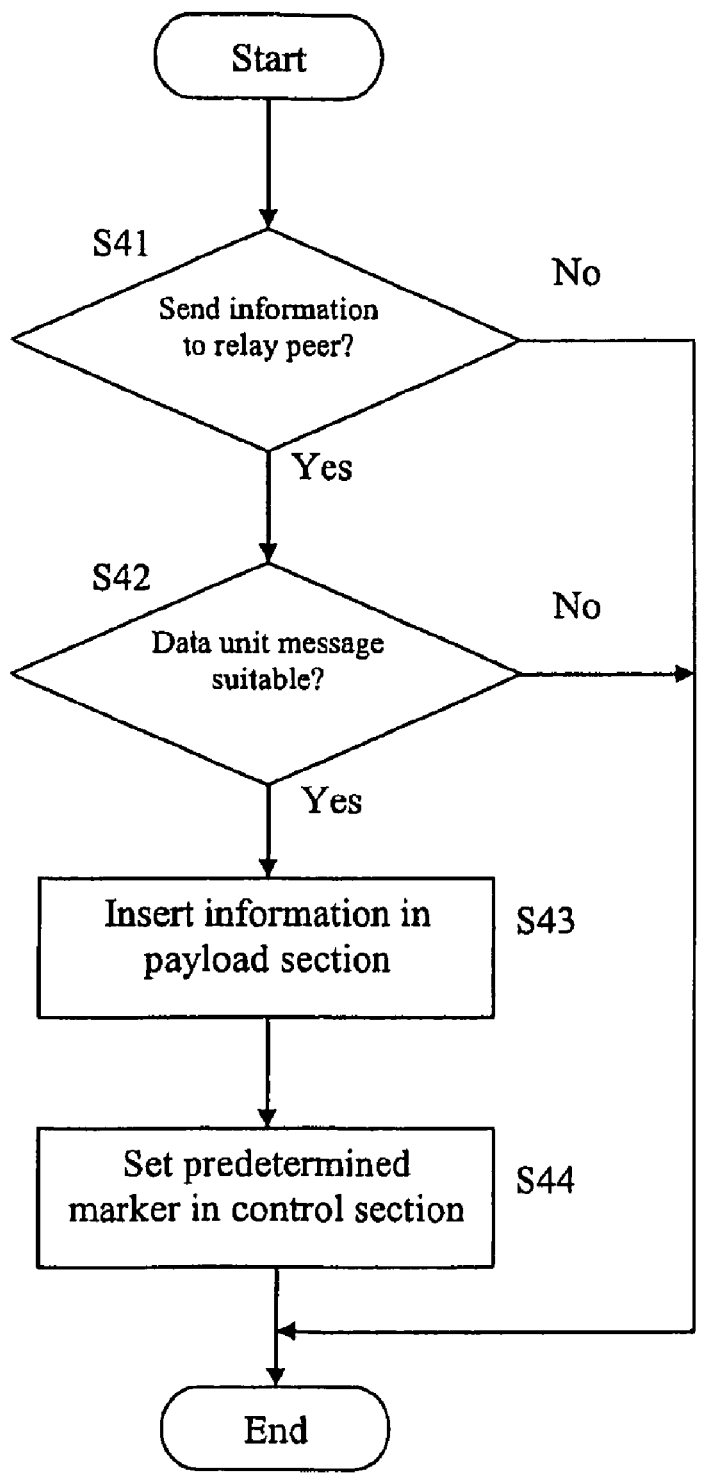
FIG. 4 shows a further flowchart of a method embodiment of the present invention.

FIG. 4 shows a flowchart of an embodiment comprising a discrimination procedure. In a first step S41, it is determined whether the peer being controlled wishes to transmit information. If this is the case, procedure S42 is started, which discriminates whether an available message is suitable for having information inserted. If a suitable message is available, then the information is inserted in the payload section in step S42 and in step S44 the predetermined marking or flag is set in the control section such that following relay peers along the relay connection may extract information from the payload section. If the outcome of one of the decisions S41 and S42 is negative, then no information is inserted and no predetermined marker is set.

As a variation of the embodiment of FIG. 4, it is also possible to employ a waiting step at the negative outcome of procedure S42, and to repeat procedure S42 after a predetermined waiting period.

As already mentioned, the discrimination procedure for discriminating whether a data unit message is suitable for setting the predetermined marker and inserting information can be arranged in a variety of ways. According to one embodiment, the sending end-peer of the relay protocol is implemented in such a way that it sets a dedicated marker in the control section of such data unit messages that it provides for the relay peers to write information into. These data unit messages can e.g. comprise an empty payload section. Such data unit messages can therefore also be referred to as dummy data unit messages, and the dedicated marker can be referred to as a dummy marker or dummy flag. Naturally, the dummy flag is different from the bus flag.

As a consequence, the discrimination procedure for determining whether a data unit message is suitable for inserting information or not can comprise checking the control section of a received data unit message for the above-mentioned dummy marker or dummy flag, where a received data unit message that carries the dummy flag is discriminated as suitable for inserting information in the payload section and setting the first marker in the control section.

The peer setting the bus flag and inserting information into the payload section may be arranged to conduct a procedure for removing the dummy flag from the control section of a data unit message in which the bus flag is set. Thereby, a subsequent relay peer will not treat the data unit message as a dummy data unit message. However, in this case it is also preferable that the peer setting the bus flag and removing the dummy flag sets a third indication in the control section of the data unit message, which serves to inform the receiving end-peer that the data unit message, although it is associated with a valid sequence position identifier, does not carry information belonging the overall data sequence being sent from the sending end-peer to the receiving end-peer. As an alternative, it is also possible that the peer setting the bus flag does not at the same time remove the dummy flag. Then, the peers along the relay connection can be arranged in such a way that they check for both the presence of the dummy flag and the bus flag, where the following logic is applied. If only the bus flag is set, then the data unit message is interpreted as a message belonging to the overall sequence of data being sent from the sending end-peer to the receiving end-peer, but each relay peer (or each identified relay peer if relay peer identifiers are being used) may read the payload section. If only the dummy flag is set, then the data unit message is interpreted as a dummy data unit message, i.e. a data unit message in which information may be written, but which does not carry data belonging to the overall sequence being sent from sending end-peer to receiving end-peer. If both the dummy flag and the bus flag are set, then the data unit message is interpreted as not carrying data of the overall sequence being sent from sending end-peer to receiving end-peer (this allows the receiving end-peer to disregard the data unit message or at least to not use the payload section for reconstructing the data sequence being transmitted), and in which information to be read by one or more relay peers has been set in the payload section.

Figure 15:
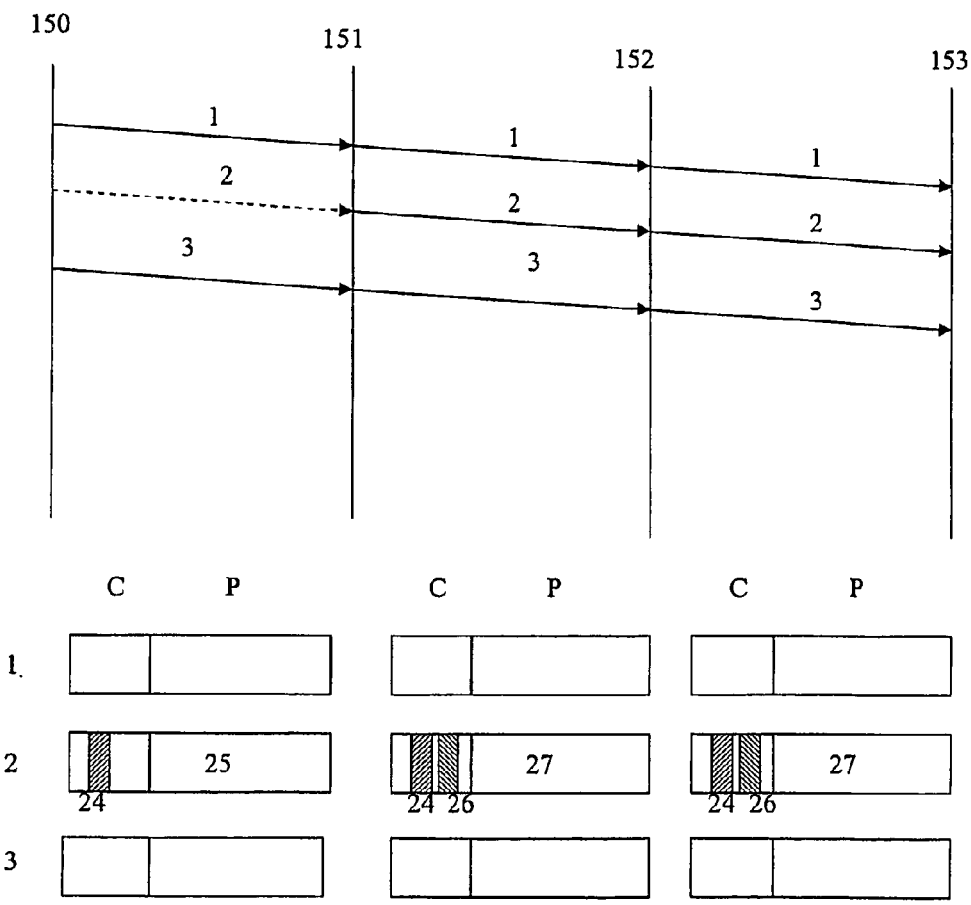
FIG. 15 shows messages and corresponding message structures in a further embodiment of the present invention.

An example of the just described concept is shown in FIG. 15. Reference numeral 150 relates to a sending end-peer of a relay ARQ protocol. Reference numerals 151 and 152 relate to relay peers of the relay ARQ protocol and reference numeral 153 relates to a receiving end-peer of the relay ARQ protocol. For the sake of simplicity, only three data unit messages and no corresponding feedback messages are shown. The three data unit messages carry sequence position identifiers "1", "2" and "3". At the bottom of the figure, it can be seen that data unit messages 1 and 3 are regular data unit messages carrying a control section C and a payload section P and carrying a part of a sequence of data pieces being sent from sending end-peer 150 to receiving end-peer 153. In the initial data unit message sent from peer 150 to peer 151, the dummy flag 24 is set in the control section C, and the payload section 25 is empty. In the example, it is assumed that peer 151 reads the dummy flag 24 and decides to insert information 27 into the payload section. As a consequence, it also sets the bus flag 26 in the control section C. The thus generated data unit message is sent to relay peer 152, which based on the set bus flag 26 may read the information 27 in the payload section. In the example, it is then assumed that peer 152 passes the data unit message to receiving end-peer 153, which is capable of interpreting the data unit message as not conveying a data piece belonging to the sequence being sent from peer 150 to peer 153 on account of both the dummy flag 24 and the bus flag 26 being set.

As an alternative or supplement to the use of the previously described dummy flag, it is also possible to place a list of one or more sequence position identifiers in the control section of a data unit message, where each sequence position identifier in the list indicates the suitability for setting the bus flag and inserting information into a data unit message associated with a listed sequence position identifier. This list of sequence position identifiers is sent in a data unit message having a neighbouring sequence position identifier to the one or more sequence position identifiers in the list. Furthermore, the sending end-peer, which places the list of sequence position identifiers into the control section of a data unit message, will not send data unit messages associated with the listed sequence position identifiers. Therefore, the same effect as the sending of dummy data unit messages is achieved (namely the listed sequence position identifiers are not associated with data unit messages that carry data pieces of the overall sequence being transmitted from the sending end-peer to the receiving end-peer), but no bandwidth is consumed for the sending of the dummy data unit messages. The listed sequence position identifiers can therefore also be referred to as dummy sequence position identifiers.

If the concept of lists of dummy sequence position identifiers is used, then the discrimination procedure conducted by the peer of the relay protocol preferably comprises checking the control sections of received data unit messages for such a list of one or more dummy sequence position identifiers, and such data unit messages associated with a listed dummy sequence position identifier are discriminated as suitable for inserting information in the payload section and setting the bus marker in the control section. Due to the fact that the sending end-peer does not send dummy data unit messages, the peer that inserts information also generates the associated data unit message.

Figure 14:
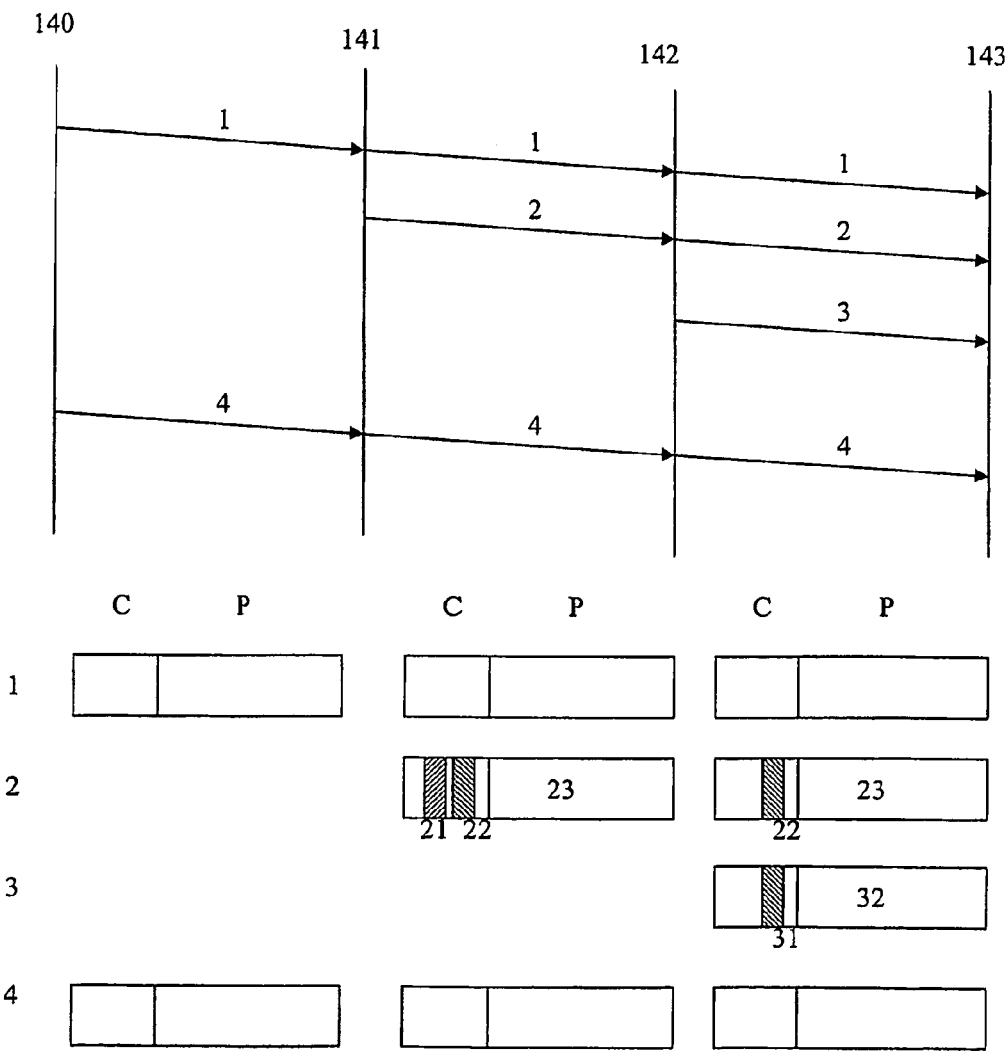
FIG. 14 shows an example of messages and their structures in a further embodiment of the present invention.

According to a further embodiment of the invention, the control procedure for the peer inserting information can further comprise a procedure for removing from the list of one or more dummy sequence position identifiers the dummy sequence position identifier associated with a data unit message in which the peer itself inserted information and set the bus flag. Then, the thus amended list is sent in a data unit message towards the receiving end-peer, be it in a data unit message in which information was inserted, or be it in another data unit message. An example of this is shown in FIG. 14. Reference numeral 140 designates a sending end-peer, reference numerals 141, 142 designate relay peers, and reference numeral 143 designates a receiving end-peer. For simplicity, the example only shows four data unit messages and no associated feedback messages. The four data unit messages are associated with respective sequence position identifiers "1", "2", "3" and "4".

Sending end-peer 140 only sends two end-to-end data unit messages having sequence position identifiers 1 and 4 towards the receiving end-peer. The data unit message with sequence position identifier 1 carries a section 10 that comprises a list indicating that sequence position identifiers 2 and 3 are dummy sequence position identifiers. Upon receiving data unit message 1, the relay peer 141 identifies from the list 10 that sequence position identifier 2 can be used for inserting information. Consequently, relay peer 141 generates a data unit message 2 carrying inserted information 23 in the payload section P and the bus flag 22. Furthermore, in the example relay peer 141 inserts a list 21 into the control section C of data unit message 2, where the list 21 indicates only sequence position identifier 3 as a dummy sequence position identifier. The data unit message 2 is then sent to relay peer 142 just as the regular data unit messages 1 and 4 are forwarded in accordance with the relay ARQ principle. Relay peer 142 receives the data unit messages with sequence position identifiers 1, 2 and 4, and from the list 21 learns that sequence position identifier 3 is a dummy sequence position identifier. In the example, relay peer 142 generates a data unit message carrying sequence position identifier 3, and inserts information 32 into the payload section P and sets the bus flag 31 in the control section C. Furthermore, the list 21 is removed from the control section C of data unit message 2, as all dummy sequence position identifiers have been used. Furthermore, the relay peer 142 may read the information 23 from data unit message 2, as the bus flag 22 is set in the control section C.

It is noted that the information 32 set in the payload section of data unit message 3 does not necessarily have to be directed towards the receiving end-peer 142. Much rather, it is possible that it is directed towards relay peer 141, and that the receiving end-peer 143 is configured to mirror the information 32 in a feedback message sent towards the sending end-peer 140.

In the example of FIG. 14, there can be a convention that no inserted information is directed towards the receiving end-peer. Then, the receiving end-peer can identify all those data unit messages that although associated with a valid sequence position identifier, do not carry a piece of data associated with the sequence being sent from the sending end-peer to the receiving end-peer on the basis of the set bus flag 22 or 31. Another way of signalling to the receiving end-peer whether or not the payload section comprises data that is part of the overall data flow from sending end-peer to receiving end-peer, is to use the previously described relay peer identifiers in the payload section, such that the receiving end-peer recognises that any data unit message that carries a relay peer identifier in its payload section does not carry end-to-end data.

A further possibility of informing the receiving end-peer consists in not removing the entries from the list of dummy sequence position identifiers, but adding a predetermined marking or flag to each entry where the setting of the flag indicates that the entered dummy sequence position identifier has in fact been used for inserting information. On the other hand, the relay peers reading the list can identify as suitable only those sequence position identifiers that are not marked as used.

The selecting and communicating of dummy sequence position identifiers and/or the sending of dummy data unit messages can be done in any suitable or desirable way. For example, the sending end-peer can regularly send dummy data unit messages and/or select one or more sequence position identifiers as dummy sequence position identifiers, and then send a corresponding list. For example, this can be done every n-th sent data unit message, or every n-th transmission time interval (TTI), where n is an integer larger than 1, e.g. n=10. Or the sending end-peer can implement an estimation procedure that attempts to estimate when one of the relay peers might want to send information of its own. For example, the wish to send messages by relay peers can be assumed or estimated during a period of set-up or release.

However, this approach can lead to an unnecessary overhead whenever in fact no relay peer would like to transmit any data. Namely, in this case the dummy data unit messages only consume bandwidth, and/or the dummy sequence position identifiers cause unnecessary overhead.

Figure 5:
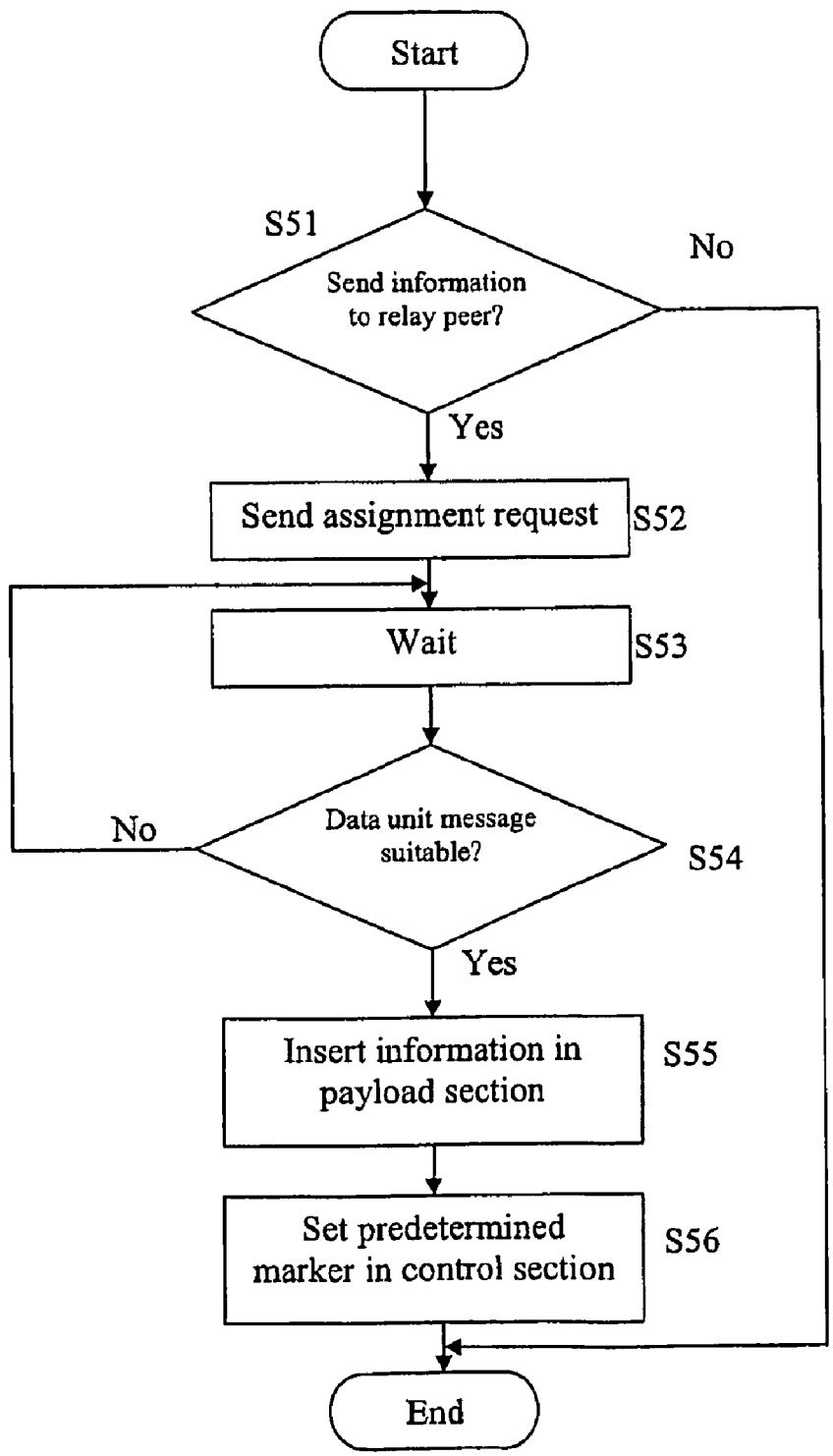
FIG. 5 shows a further flowchart of a method embodiment of the present invention.

As a consequence, in accordance with a further embodiment of the invention, the control procedure for a peer of the relay ARQ protocol comprises a procedure for sending to the sending end-peer an assignment request for assigning a sequence position identifier associated with a data unit message suitable for setting the bus flag and inserting information. Preferably, the control procedure is then such that the setting of the bus flag and the inserting of information may only occur in a data unit message if previously an assignment request was sent to the sending end-peer. This avoids the problem that one relay peer requests an assignment but another relay peer upstream then "consumes" the assigned dummy sequence position identifier. An example for this is shown in FIG. 5. In a first step S51, similar to the steps S41 and S31 described in FIGS. 4 and 3, respectively, it is first determined whether the relay peer wishes to transmit information. If this is the case, then an assignment request is sent in procedure S52. On account of the delay necessary for the assignment request reaching the sending end-peer, a waiting step S53 follows. Thereafter, S54 asks whether a suitable data unit is available, i.e. whether a dummy data unit message has arrived or a list with dummy sequence position identifiers. If not, the waiting step S53 is repeated, and otherwise the control flow proceeds to insert the information to be transmitted in the payload section S55, and sets the bus flag in the control section of a given data unit message in step S56.

The sending of the assignment request can be accomplished in any suitable or desirable way. For example, the procedure for sending an assignment request can set a determined request marker in a control section of one of the messages being sent by the relay peer. The assignment request can be sent in one or both of a data unit message being sent towards the receiving end-peer, which is then subsequently mirrored, or in one of the feedback messages being sent towards the sending end-peer. According to a further possibility, if the relay connection over which the sending end-peer sends data unit messages to the receiving end-peer is a first relay connection, and there is also a second relay connection in the opposite direction, i.e. in which the receiving end-peer of the first connection is the sending end-peer and the sending end-peer of the first connection is the receiving end-peer, then the procedure for sending an assignment request can also include the request in a data unit message being sent over the second relay connection.

According to a further embodiment of the invention, a control method for a sending end-peer of a relay ARQ protocol preferably comprises an assigning procedure for assigning one or more sequence position identifiers as usable by one or more relay peers for inserting information in the payload section and setting the bus flag in the control section of a data unit message associated with an assigned sequence position identifier. In other words, the sending end-peer is preferably able to assign dummy sequence position identifiers, and to send a list of the assigned dummy sequence position identifiers to the relay peers and/or send corresponding dummy data unit messages.

Figure 6:
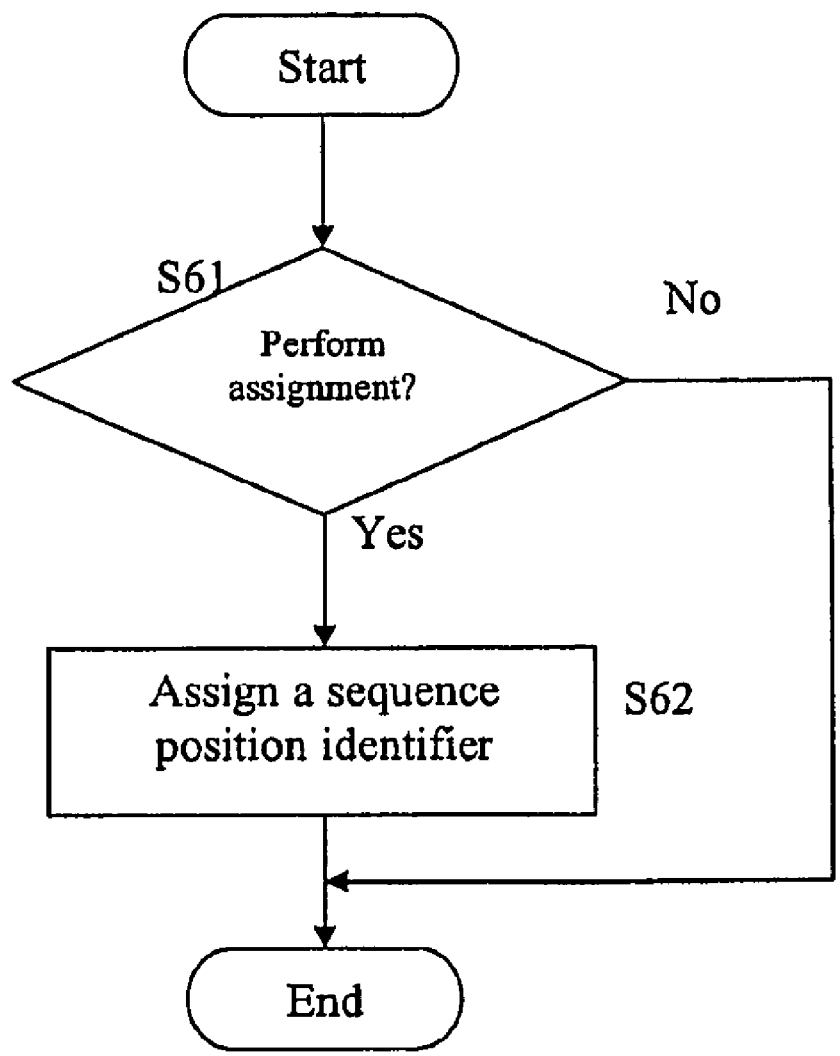
FIG. 6 shows a further flowchart of a method embodiment of the present invention.

A flow chart of such a procedure is shown in FIG. 6. In a first step S61 it is determined whether an assignment is to be performed or not. For example, step S61 can consist in determining whether an assignment request has been received. If yes, then procedure S62 assigns a dummy sequence position identifier and communicates this accordingly, e.g. by sending a dummy data unit message or sending a list containing the assignment dummy sequence position identifier. According to another example, step S61 can consist in determining whether a condition for regularly performing the assignment as occurred e.g. whether (n−1) regular data unit messages have been sent, such that now a dummy sequence position identifier may be assigned and corresponding dummy data unit may be sent.

Figure 7C:
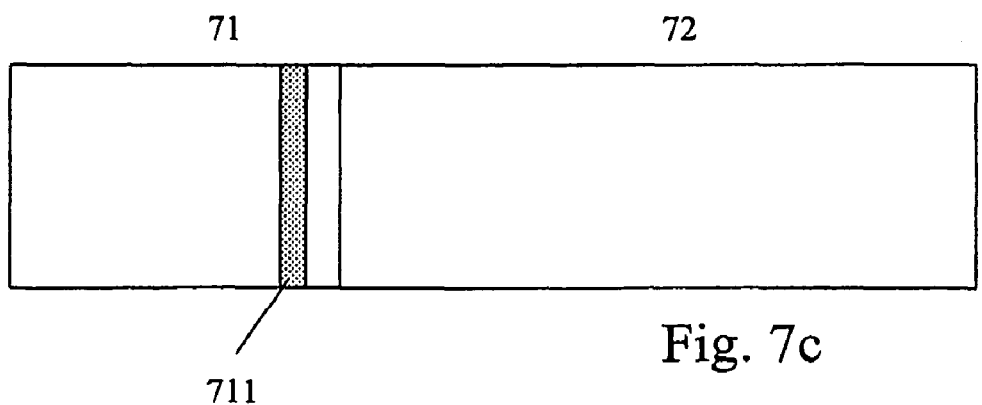

As already mentioned previously, the suitability of a data unit message for inserting information can be indicated by a predetermined marker different from the bus flag, i.e. by a dummy flag. An example of this is shown in FIG. 7c, where the control section 71 of a data unit message comprises the dummy marker or dummy flag 711, and the payload section 72 is empty. If assignment requests are used, then the method of controlling the sending end-peer preferably comprises a procedure for detecting an assignment request in a received message, where an assignment is then triggered upon detecting an assignment request. For example, this can be done by checking for the presence of an assignment request in feedback messages being received at the sending end-peer. On the other hand, if the sending end-peer of a first relay connection is at the same time the receiving end-peer of a second relay connection involving the same communication nodes, then the procedure for detecting an assignment request may also look for such an assignment request in data unit messages of the second relay connection.

Up to now, the present invention has been described in terms of a control method for various peers of a relay ARQ connection. However, the present invention can also be embodied in the form of a data structure arranged for providing the previously described functionality. In other words, the present invention also relates to a data structure of a message adhering to a relay protocol, where the structure comprises a control section and a payload section. In accordance with the relay protocol, a sending end-peer sends data unit messages arranged in a sequence towards the receiving end-peer and each sent data unit message is identifiable by a sequence position identifier. Feedback messages are received by the sending end-peer, which by using the sequence position identifiers carry receipt information on a receipt of the data unit messages. The relay protocol provides for at least the previously described first and second type of receipt information. The data structure according to the invention is then such that the control section comprises a marker or flag for indicating to a relay peer of the relay protocol that information may be extracted from the payload section. An example of this is shown in FIG. 7a, where the control section 71 of a message comprises a marker or flag 710, i.e. the bus flag.

According to a preferred embodiment, the data structure comprises a relay peer identifier, more preferably the payload section is divided into a relay peer identification part 721 (see FIG. 7b) and an information part 722 for the insertion of information by a relay peer.

According to a further preferred embodiment, the data structure may also comprise a further marker different from the bus flag, namely the dummy flag 711 shown in FIG. 7c.

According to another preferred embodiment, the control section of the data structure may comprise a list of one or more assigned dummy sequence position identifiers that indicate to one or more relay peers a suitability for inserting information and setting the bus flag into a data unit message associated with one of the assigned dummy sequence position identifiers.

Figure 8:
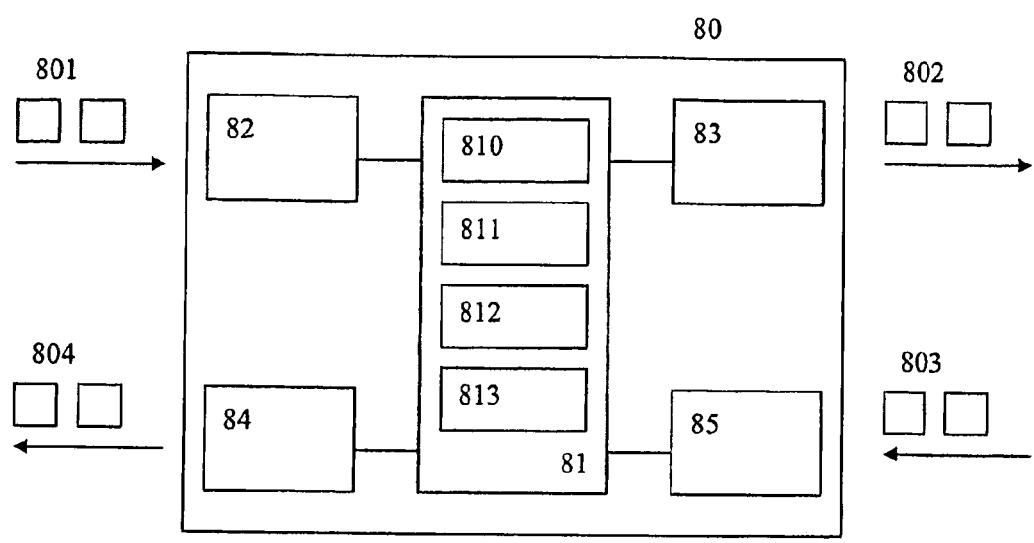
FIG. 8 shows a block diagram of a device embodiment of the present invention.

The present invention may furthermore be embodied in the form of a communication device arranged for implementing one or more of the previously described control methods for implementing a peer of a relay ARQ protocol. In general, such a communication device can provide the functionalities in any suitable or desirable way, e.g. by hardware, software or any suitable combination of hardware and software. For example, FIG. 8 shows a communication device arranged for implementing a relay peer of a relay ARQ protocol. The communication device comprises a processor 81 and buffers 82-85. It receives data unit messages 801 in a receive buffer 82, and forwards data unit messages 802 from a send buffer 83. Equally, it receives feedback messages 803 in a receive buffer 85, and sends/forwards feedback messages 804 from a send buffer 84. The buffers 82-85 can be implemented in one or more physical memory devices. The processor 81 comprises a control section reader 810 for reading the control section of at least some of the messages 801, 803 being sent over the relay connection of which communication device BO is a part. Furthermore, a forwarder 811 is provided for forwarding at least the payload section of received data unit messages 801 in data unit messages 802 towards the receiving end-peer and for forwarding at least receipt information of the second type received in feedback messages 803 towards the sending end-peer in feedback messages 804. Furthermore, a retransmitter 812 is provided for performing retransmissions of data unit messages 8Q2 based on feedback message 803. Finally, an information extractor 813 is provided for extracting information from the payload sections of such messages 801, 803 in which the control section reader 810 detects the presence of a predetermined marker in the control section, i.e. detects the presence of the bus flag.

The elements 810-813 can e.g. be provided as hardware components in a processor 81, or as software elements in a control program running on processor 81.

Figure 9:
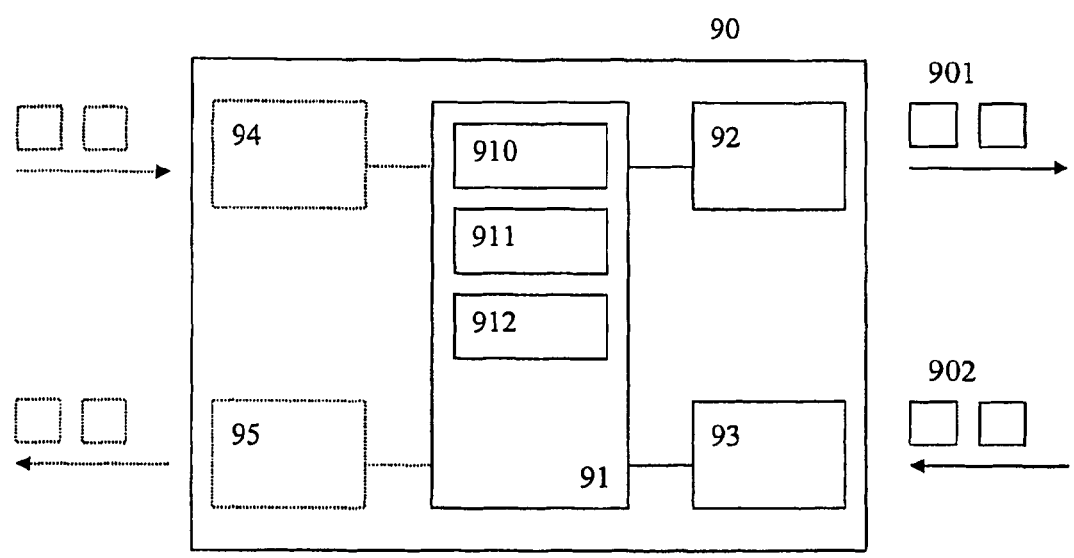
FIG. 9 shows a block diagram of a further device embodiment of the present invention.

FIG. 9 shows a further device embodiment of the present invention, in which a communication device is arranged for implementing a peer of a relay ARQ protocol. The communication device 90 may act as a sending end-peer or as a relay peer. If it acts as a sending end-peer, then it comprises a send buffer 92 for sending data unit messages 901 and a receiving buffer 93 for receiving feedback messages 902. Furthermore, it comprises a processor 91. If it acts as a relay peer, it additionally comprises a buffer 94 for receiving data unit messages from the side of the sending end-peer, and a buffer 95 for holding feedback messages to be sent towards the side of the sending end-peer.

The processor 91 comprises a sender 910 for sending the data unit messages 901 towards the receiving end-peer. Furthermore, a retransmitter 911 is provided for performing retransmissions for the data unit messages 901 on the basis of the feedback messages 902. Finally, a marker setter 912 is provided for setting the predetermined marker or bus flag in the control section of one or more of the messages (data unit message 901 and possibly feedback message being sent from buffer 95), where the predetermined marker is arranged such that a relay peer of the relay ARQ protocol along the relay connection may extract information from the payload section of a message carrying the predetermined marker.

Similar to the case of FIG. 8, the elements 910-912 can be provided as hardware, software or any suitable combination of hardware and software. For example, there can be software elements of a control program running on processor 91.

Figure 10:
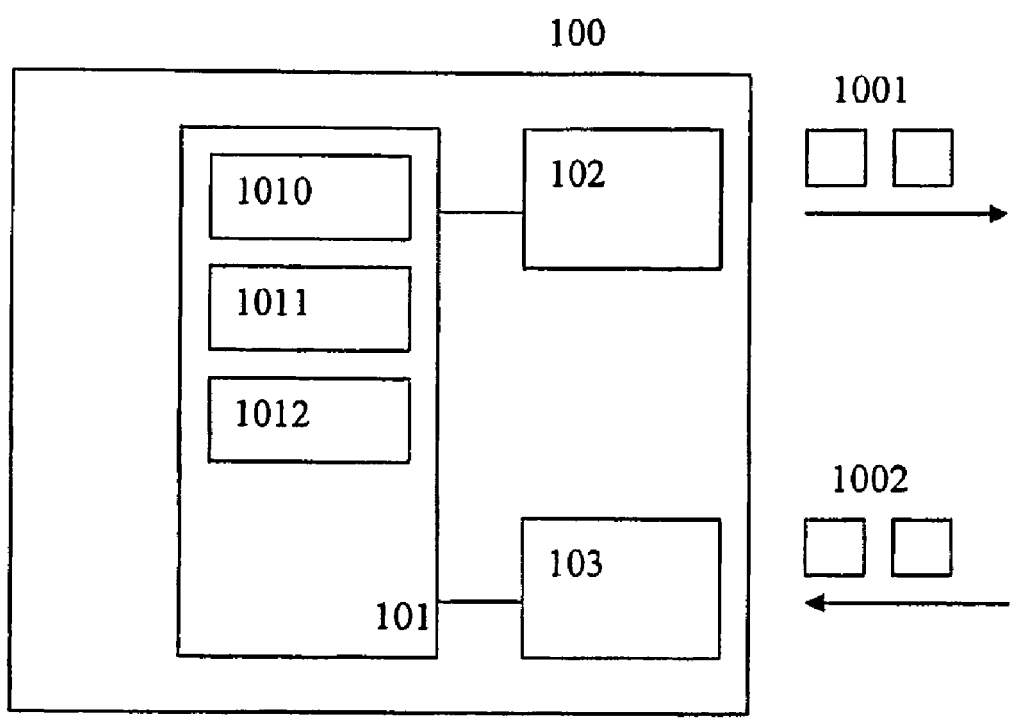
FIG. 10 shows a block diagram of a further device embodiment of the present invention.

FIG. 10 shows a further device embodiment of the present invention. It shows a communication device 100 for implementing a sending end-peer of a relay ARQ protocol. A processor 101 is provided, and a send buffer 102 for holding data unit messages 1001 to be sent, and a receive buffer 103 for receiving feedback messages 1002. The processor 101 comprises a sender 1010 for sending the data unit messages 1001 towards the receiving end-peer. A retransmitter 1011 is provided for performing retransmissions for the sent data unit messages 1001 on the basis of the feedback messages 1002. Furthermore, an assigner 1012 is provided for assigning one or more sequence position identifiers as usable by one or more relay peers for setting a predetermined marker (the bus flag) in a control section and inserting information into the payload section of a data unit message associated with an assigned sequence position identifier. In other words, the assigner 1012 assigns dummy sequence position identifiers.

Similar to the description of FIGS. 8 and 9, the elements 1010 to 1012 may be provided by hardware, software or any suitable combination of hardware and software. They can e.g. be software elements of a control program running on processor 101.

Now further examples will be described, in which one or more of the previously described concepts can be advantageously put to use.

In the context of wireless telecommunication systems, various kinds of measurement reporting to peer devices in a communication are used. Typical measurements are "received signal quality" (CQI), "current transmit power", "current resource utilisation", or "buffer fill level". Such measurements should be signalled to one or more peers in the network, for example from a mobile device (e.g. a User Equipment (UE) of a GSM or UMTS system) to a base station (e.g. a NodeB of a UMTS system) and/or to a network controller (e.g. a Radio Network Controller (RNC) of a UMTS system). A relay ARQ protocol may connect two endpoints e.g. the UE and the RNC which span over a number of intermediate relay nodes. A nodeB could e.g. act as a relay node or relay peer. Measurements of the above-mentioned kind are useful at all peers, i.e. also at the intermediate nodeB. A communication of this information to all peers in one process can be accomplished using the above-described bus flag, as it is no longer necessary to send individual parallel messages to each peer that wishes to receive the appropriate information.

Figure 12A:
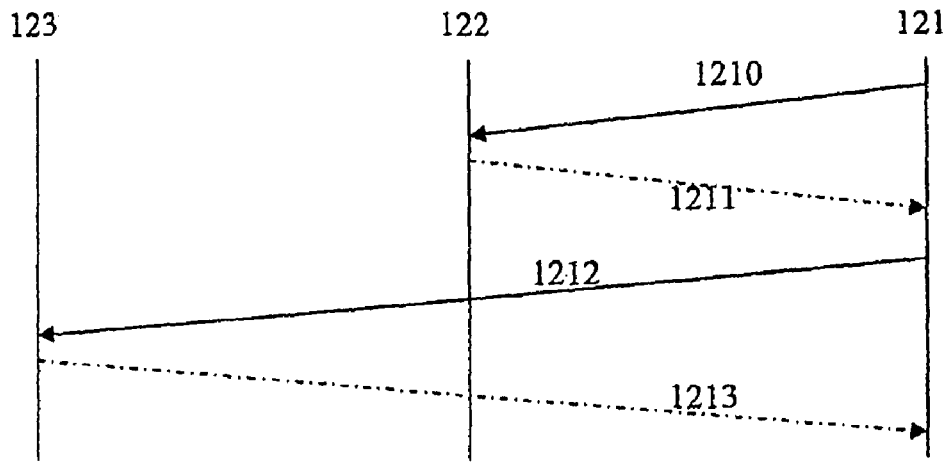
FIGS. 12a and 12b show message flows for explaining an embodiment of the present invention.

FIG. 12 shows a further possibility of applying the present invention. Reference numeral 121 relates to a control element of a wireless network, e.g. a radio network controller (RNC). Reference numeral 122 relates to a base station, such as the above-mentioned nodeB. Finally, reference numeral 123 relates to a wireless or mobile communication device, e.g. the above-mentioned UE. FIG. 12a shows a prior art situation for Radio Resource Control (RRC) signalling in such a system. For example, the establishment of a new Radio Access Bearer (RAB) requires the coordination of multiple nodes and protocols. First, the network controller 121 informs the base station 122 with a message 1210 about the settings for the new RAB. The base station 122 acknowledges this with the message 1211, e.g. an NBAP acknowledgement. Afterwards, the network controller 121 configures the mobile station 123 by sending an appropriate setup message, e.g. an RRC-RAB-Set-up message) via the intermediate node 122, see message 1212. A corresponding acknowledgement 1213 is then expected.

Figure 12B:
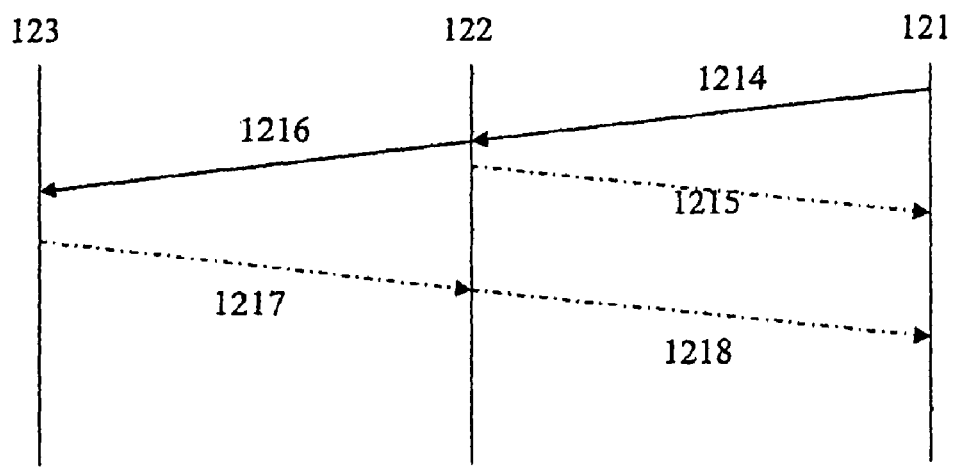

FIG. 12b shows how the above-described concepts of the present invention can greatly simplify the process shown in FIG. 12a. Namely, if the network controller 121 is arranged as a sending end-peer of the relay ARQ protocol, the base station 122 as a relay peer and the mobile station 123 as a receiving end-peer, it is possible to perform a single radio access bearer setup by sending a data unit message 1214 to base station 122, which message carries the bus flag such that the relay peer implemented in base station 122 can read the setup information. Also, the data message is forwarded as message 1216 to mobile station 123, such that both nodes 122 and 123 can share the same setup information. The receipt is confirmed by appropriate feedback messages namely a feedback message of the first kind (RACK) 1215 and a feedback message of the second kind (ACK) 1217 that is forwarded by the relay peer in node 122 as feedback message 1218 to the sending end-peer implemented in the network controller 121.

Using the concept described in FIG. 12b, the base station 122 can scan the control messages dedicated to the mobile station 123, and if the network controller 121 asks the mobile station 123 to establish a new radio access bearer (i.e. a new logical channel), then the base station 122 can at the same time also establish the new protocol instances based on that information, without having to go through the consecutive message exchange shown in FIG. 12a.

Figure 13A:
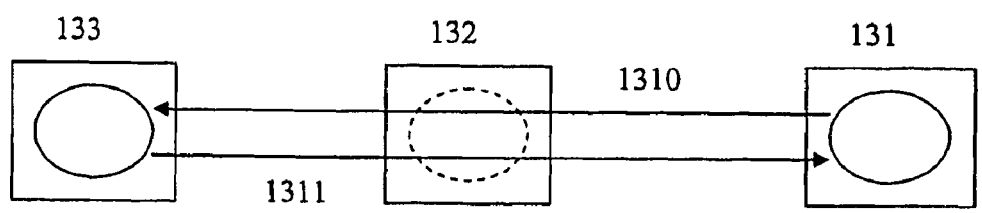
FIGS. 13a and 13b show message flows for explaining a further embodiment of the present invention.
Figure 13B:
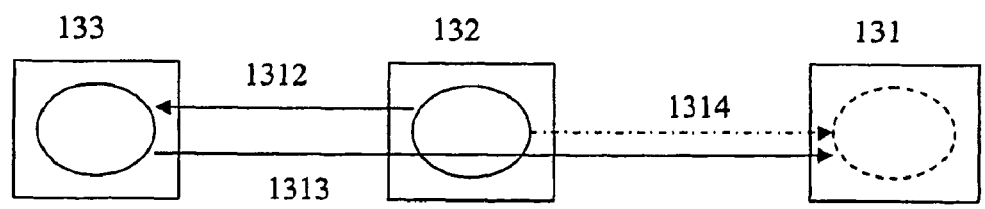

A further example is shown in FIGS. 13a and 13b. Reference numeral 131 again relates to a network controller, such as an RNC, reference numeral 132 relates to a base station, such as a nodeB, and reference numeral 133 relates to a wireless or mobile station, such as UE. The ovals within the elements 131 to 133 symbolize processes, where the process of network controller 131 is a master process and the process in the mobile station 133 is a slave process. The oval in node 132 symbolizes a master proxy that is capable of taking over the master control from the master process in network controller 131. Thereby, the master process in the network controller can temporarily delegate the control responsibility to the master proxy in base station 132. If the master proxy fails, e.g. due to a handover to a new base station, the control responsibility can automatically fall back to the master process in the network controller 131.

If again all three elements are arranged to implement a peer of a relay ARQ protocol, then it is possible to let the master proxy in base station 132 "listen in" to all communications 1310, 1311 exchanged between the master process and the slave process, see FIG. 13a. This "listening" is accomplished using the bus flag described above. Thereby, the master proxy can build up its own soft-state and can continuously be prepared to become active. If it becomes active, as shown in FIG. 13b, it can take over control and send appropriate control messages 1312 to the slave process. At the same time, the response messages 1213 from the slave process can continue to be directed towards the master process in network controller 31, where the master proxy in base station 132 again simply "listens in" on them, to thereby continue to perform the master control operation. At the same time, the master proxy can send report messages 1314 to the master process, in order to keep the master process informed of the activities of the master proxy.

The present invention has been described by referring to detailed embodiments. These serve to provide a better understanding of the invention, but are not intended to be limiting. The scope of protection is defined by the appended claims. Reference signs in the claims are also not intended to be limiting, as they only serve to make the claims easier to read.

What is claimed is:

1. Method of controlling a relay peer of a relay protocol for sending data unit messages over a relay connection that comprises a sending end-peer of said relay protocol, a receiving end-peer of said relay protocol and one or more relay peers of said relay protocol, each data unit message comprising a respective control section and a payload section, where in accordance with said relay protocol said sending end-peer sends data unit messages arranged in a sequence towards said receiving end-peer, each data unit message being identifiable by a sequence position identifier, and receives feedback messages that by using said sequence position identifiers carry receipt information on a receipt of said data unit messages, where said relay protocol provides for at least a first type and a second type of receipt information, said first type of receipt information being indicative of a correct receipt of a data unit message at one of said relay peers of said relay protocol, and said second type of receipt information being indicative of a correct receipt of a data unit message at said receiving end-peer of said relay protocol, said method comprising:
   a procedure for forwarding said payload section of said data unit messages towards said receiving end-peer and for forwarding said second type of receipt information towards said sending end-peer,
   a procedure for performing retransmissions for said data unit messages on a basis of said feedback messages, and
   a procedure for extracting information from said payload section of said data unit messages in which a procedure for reading a control section detects a presence of a predetermined marker in said control section.

2. The method of claim 1, wherein said information extracted from said payload section is passed to a protocol layer lying above a layer of said relay protocol.

3. The method of claim 1, wherein said data unit messages in which said procedure for reading said control section detected said presence of said predetermined marker are forwarded after extracting said information.

4. The method of claim 1, wherein said data unit messages in which said procedure for reading said control section detected said presence of said predetermined marker are discarded after extracting said information.

5. The method of claim 4, wherein subsequent to discarding said data unit message, an indication of said discarding is sent out.

6. The method of claim 1, wherein said procedure for reading said control section is arranged to read a relay peer identifier in said data unit messages in which said predetermined marker is set, and said procedure for extracting information only extracts said information if said relay peer identifier is associated with said relay peer.

7. A method of controlling a peer of a relay protocol for sending data unit messages over a relay connection that comprises a sending end-peer of said relay protocol, one or more relay peers of said relay protocol and a receiving end-peer of said relay protocol, each data unit message comprising a respective control section and a payload section, where in accordance with said relay protocol said sending end-peer sends data unit messages arranged in a sequence towards said receiving end-peer, each data unit message being identifiable by a sequence position identifier, and receives feedback messages that by using said sequence position identifiers carry receipt information on a receipt of said data unit messages, where said relay protocol provides for at least a first type and a second type of receipt information, said first type of receipt information being indicative of a correct receipt of a data unit message at one of said relay peers of said relay protocol, and said second type of receipt information being indicative of a correct receipt of a data unit message at said receiving end-peer of said relay protocol, said method comprising:

a procedure for sending said data unit messages towards said receiving end-peer, and a procedure for performing retransmissions for said data unit messages on a basis of said feedback messages, and a marker setting procedure for setting a predetermined marker in said control section of one or more of said data unit message, said predetermined marker being arranged such that a relay peer of said relay protocol along said relay connection extracts information from said payload section of said data unit messages carrying said predetermined marker.

8. The method of claim 7, wherein said payload section of said data unit messages in which said predetermined marker is set is arranged to comprise a relay peer identifier.

9. The method of claim 8, wherein said payload section of said data unit messages in which said predetermined marker is set is arranged to comprise a relay peer identification subsection and an information subsection.

10. The method of claim 7, further comprising an information insertion procedure for inserting information into said payload section of said data unit messages in which said predetermined marker is set.

11. The method of claim 10, wherein said information insertion procedure is arranged for inserting information in said payload section that is associated with a set-up process for said relay connection.

12. The method of claim 10, wherein said information insertion procedure is arranged for inserting information in said payload section that is associated with a status of said relay connection.

13. The method of claim 10, comprising a procedure for adding an indication to at least some of said data unit messages in which said predetermined marker is set, said indication being arranged such that said receiving end-peer receiving said data unit messages comprising said indication disregards said payload section.

14. The method of claim 10, wherein said peer is one of said one or more relay peers and said method further comprises a discrimination procedure for discriminating data unit messages as suitable for setting said predetermined marker and inserting information.

15. The method of claim 14, wherein said predetermined marker is a first predetermined marker, and said discrimination procedure comprises checking said control sections of received data unit messages for a second predetermined marker different from said first predetermined marker, where such received data unit messages that carry said second predetermined marker are discriminated as suitable for setting said first predetermined marker and inserting information.

16. The method of claim 15, further comprising a procedure for removing said second predetermined marker from said control section of a data unit message in which said first predetermined marker is set.

17. The method of claim 14, wherein said discrimination procedure comprises checking said control sections of received data unit messages for a list of one or more sequence position identifiers, where data unit messages associated with said list of one or more sequence position identifiers are discriminated as suitable for setting said predetermined marker and inserting information.

18. The method of claim 17, further comprising a procedure for removing from said list of one or more sequence position identifiers a sequence position identifier associated with a data unit message in which said predetermined marker is set, and forwarding an amended list in a direction of said receiving end-peer.

19. The method of claim 14, further comprising a procedure for sending an assignment request to said sending end-peer for assigning a sequence position identifier associated with a data unit message suitable for setting said predetermined marker and inserting information.

20. The method of claim 19, wherein said procedure for sending said assignment request sets a predetermined request marker in a control section of one of said data unit messages.

21. The method of claim 19, wherein said procedure for sending said assignment request sends said assignment request in one or both of:

one of said data unit messages being sent towards said receiving end-peer, and one of said feedback messages being sent towards said sending end-peer.

22. The method of claim 19, wherein said relay connection is a first relay connection, and where said procedure for sending said assignment request sends said assignment request in a data unit message of a second relay connection in which said receiving end-peer of said first relay connection is a sending end-peer of said second relay connection, and said sending end-peer of said first relay connection is a receiving end-peer of said second relay connection.

23. The method of claim 19, wherein said marker setting procedure may only set said predetermined marker in a data unit message if previously said assignment request was sent to said sending end-peer.

24. A method of controlling a sending end-peer of a relay protocol for sending data unit messages over a relay connection that comprises said sending end-peer of said relay protocol, one or more relay peers of said relay protocol and a receiving end-peer of said relay protocol, each data unit message comprising a control section and a payload section, where in accordance with said relay protocol said sending end-peer sends data unit messages arranged in a sequence towards said receiving end-peer, each sent data unit message being identifiable by a sequence position identifier, and receives feedback messages that by using said sequence position identifiers carry receipt information on a receipt of said data unit messages, where said relay protocol provides for at least a first type and a second type of receipt information, said first type of receipt information being indicative of a correct receipt of a data unit message at one of said relay peers of said relay protocol, and said second type of receipt information being indicative of a correct receipt of a data unit message at said receiving end-peer of said relay protocol, said method comprising:
- a procedure for sending said data unit messages towards said receiving end-peer,
- a procedure for performing retransmissions for said data unit messages on a basis of said feedback messages, and
- an assigning procedure for assigning one or more of said sequence position identifiers as usable by said one or more relay peers for setting a predetermined marker in a control section and inserting information in a payload section of a data unit message associated with an assigned sequence position identifier.

25. The method of claim 24, wherein said predetermined marker is a first predetermined marker, and said method further comprises a procedure for sending a dummy data unit message associated with one of said assigned sequence position identifiers, said dummy data unit message comprising second predetermined marker in a control section thereof different from said first predetermined marker, and having an empty payload section.

26. The method of claim 24, comprising a procedure for inserting a list of one or more assigned sequence position identifiers into one or more control sections of data unit messages.

27. The method of claim 24, comprising a procedure for detecting an assignment request in a received data unit message, said procedure triggering said assigning procedure upon detecting said assignment request.

28. The method of claim 27, wherein said procedure for detecting said assignment request checks for a presence of said assignment request in said feedback messages being sent towards said sending end-peer.

29. The method of claim 27, wherein said relay connection is a first relay connection, and where said procedure for detecting an assignment request checks for a presence of said assignment request in data unit messages of a second relay connection in which said receiving end-peer of said first relay connection is a sending end-peer of said second relay connection, and said sending end-peer of said first relay connection is a receiving end-peer of said second relay connection.

30. A data structure embodied in a non-transitory computer readable medium of a data unit message adhering to a relay protocol, said structure comprising a control section and a payload section, where in accordance with said relay protocol said sending end-peer sends data unit messages arranged in a sequence towards said receiving end-peer, each sent data unit message being identifiable by a sequence position identifier, and receives feedback messages that by using said sequence position identifiers carry receipt information on a receipt of said data unit messages, where said relay protocol provides for at least a first type and a second type of receipt information, said first type of receipt information being indicative of a correct receipt of a data unit message at a relay peer of said relay protocol, and said second type of receipt information being indicative of a correct receipt of a data unit message at a receiving end-peer of said relay protocol, wherein said data structure is such that said control section comprises a predetermined marker for indicating to a relay peer of said relay protocol to extract information from said payload section.

31. The data structure embodied in said non-transitory computer readable medium of claim 30, wherein said payload section comprises a relay peer identifier.

32. The data structure embodied in said non-transitory computer readable medium of claim 30, wherein said predetermined marker is a first predetermined marker, and said control section comprises a second predetermined marker different from said first predetermined marker, said second predetermined marker indicating to said relay peer a suitability for setting said first predetermined marker and inserting information into a data unit message carrying said second predetermined marker.

33. The data structure embodied in said non-transitory computer readable medium of claim 30, wherein said control section comprises a list of one or more assigned sequence position identifiers indicating to said relay peer a suitability for setting said predetermined marker and inserting information into a data unit message associated with one of said assigned sequence position identifiers.

34. A communication device arranged for implementing a relay peer of a relay protocol for sending data unit messages over a relay connection that comprises a sending end-peer of said relay protocol, a receiving end-peer of said relay protocol and one or more relay peers of said relay protocol, each data unit message comprising a respective control section and a payload section, where in accordance with said relay protocol said sending end-peer sends data unit messages arranged in a sequence towards said receiving end-peer, each sent data unit message being identifiable by a sequence position identifier, and receives feedback messages that by using said sequence position identifiers carry receipt information on a receipt of said data unit messages, where said relay protocol provides for at least a first type and a second type of receipt information, said first type of receipt information being indicative of a correct receipt of a data unit message at one of said relay peers of said relay protocol, and said second type of receipt information being indicative of a correct receipt of a data unit message at said receiving end-peer of said relay protocol, said communication device comprising:
- a control section reader for reading said control section of at least some of said data unit messages being sent over said relay connection,
- a forwarder for forwarding said payload section of data unit messages towards said receiving end-peer and for forwarding said second type of receipt information towards said sending end-peer,
- a retransmitter for performing retransmissions for said data unit messages on a basis of said feedback messages, and
- an information extracter for extracting information from said payload section of said data unit messages in which said control section reader detects a presence of a predetermined marker in said control section.

35. A communication device arranged for implementing a peer of a relay protocol for sending data unit messages over a relay connection that comprises a sending end-peer of said relay protocol, one or more relay peers of said relay protocol and a receiving end-peer of said relay protocol, each data unit message comprising a respective control section and a payload section, where in accordance with said relay protocol said sending end-peer sends data unit messages arranged in a sequence towards said receiving end-peer, each sent data unit message being identifiable by a sequence position identifier, and receives feedback messages that by using said sequence position identifiers carry receipt information on a receipt of said data unit messages, where said relay protocol provides for at least a first type and a second type of receipt information, said first type of receipt information being indicative of a correct receipt of a data unit message at one of said relay peers of said relay protocol, and said second type of receipt information being indicative of a correct receipt of a data unit message at said receiving end-peer of said relay protocol, said communication device comprising:

a sender for sending said data unit messages towards said receiving end-peer, a retransmitter for performing retransmissions for said data unit messages on a basis of said feedback messages, and a marker setter for setting a predetermined marker in said control section of one or more of said data unit message, said predetermined marker being arranged such that a relay peer of said relay protocol along said relay connection extracts information from said payload section of data unit messages carrying said predetermined marker.

36. A communication device for implementing a sending end-peer of a relay protocol for sending data unit messages over a relay connection that comprises said sending end-peer of said relay protocol, one or more relay peers of said relay protocol and a receiving end-peer of said relay protocol, each data unit message comprising a control section and a payload section, where in accordance with said relay protocol said sending end-peer sends data unit messages arranged in a sequence towards said receiving end-peer, each sent data unit message being identifiable by a sequence position identifier, and receives feedback messages that by using said sequence position identifiers carry receipt information on a receipt of said data unit messages, where said relay protocol provides for at least a first type and a second type of receipt information, said first type of receipt information being indicative of a correct receipt of a data unit message at one of said relay peers of said relay protocol, and said second type of receipt information being indicative of a correct receipt of a data unit message at said receiving end-peer of said relay protocol, said communication device comprising:

a sender for sending said data unit messages towards said receiving end-peer, a retransmitter for performing retransmissions for said data unit messages on a basis of said feedback messages, and an assigner for assigning one or more of said sequence position identifiers as usable by said one or more relay peers for setting a predetermined marker in a control section and inserting information in a payload section of a data unit message associated with an assigned sequence position identifier.

\* \* \* \* \*

UNITED STATES PATENT AND TRADEMARK OFFICE
CERTIFICATE OF CORRECTION

PATENT NO. : 8,392,780 B2
APPLICATION NO. : 12/293752
DATED : March 5, 2013
INVENTOR(S) : Wiemann et al.

It is certified that error appears in the above-identified patent and that said Letters Patent is hereby corrected as shown below:

In the Specification:

In Column 4, Line 64, delete "a'" and insert -- a --, therefor.

In Column 15, Line 62, delete "BO" and insert -- 80 --, therefor.

In Column 16, Line 2, delete "8Q2" and insert -- 802 --, therefor.

In the Claims:

In Column 18, Line 36, in Claim 1, delete "Method" and insert -- A method --, therefor.

Signed and Sealed this
Sixteenth Day of July, 2013

Teresa Stanek Rea
*Acting Director of the United States Patent and Trademark Office*